United States Patent [19]

Blackwelder et al.

[11] Patent Number: 5,026,338
[45] Date of Patent: Jun. 25, 1991

[54] METHOD FOR FORMING A ROLLED RIM IN A FABRICATED THERMOPLASTIC CONTAINER

[75] Inventors: Maurice W. Blackwelder, Bardstown, Ky.; James A. Hill, Toledo, Ohio

[73] Assignee: Owens-Illinois Plastic Products Inc., Toledo, Ohio

[21] Appl. No.: 338,026

[22] Filed: Apr. 14, 1989

[51] Int. Cl.⁵ ............................................. B29C 57/12
[52] U.S. Cl. .................................. 493/158; 264/322; 425/393
[58] Field of Search ............... 425/392, 393; 264/295, 264/322; 493/158, 159

[56] References Cited

U.S. PATENT DOCUMENTS

| | | | |
|---|---|---|---|
| 2,272,920 | 2/1942 | Merta | 493/158 |
| 3,065,677 | 11/1962 | Loeser | 425/393 |
| 3,854,583 | 12/1974 | Amberg et al. | |
| 4,053,346 | 10/1977 | Amberg et al. | |
| 4,072,549 | 2/1978 | Amberg et al. | |
| 4,281,979 | 8/1981 | Doherty et al. | 425/393 |

Primary Examiner—Frederick R. Schmidt
Assistant Examiner—Jack Lavinder

[57] ABSTRACT

A device for forming a rolled rim at the unrimmed mouth of the body of a container having a body which is fabricated from a sheet of an expanded thermoplastic material, the device including a first member with a first annular rim-forming surface, and a second member which is reciprocable relative to the first member. The second member has a second annular rim-forming surface which forms a generally closed rim-forming chamber with the first annular rim-forming surface when the second member is in a first position relative to the first member, the second member being reciprocable to a second position in which the first annular surface and the second annular surface are separated to permit the withdrawal of a container with a rolled rim at the mouth from the first member. The device further includes a transfer mechanism for inserting a container with an unrimmed mouth over a frustoconical portion of the first member to position such container to have a rim rolled in the mouth thereof in such rim-forming chamber and to withdraw a container with a rolled rim at the mouth from the first member. The rim-forming chamber is heated and there is no relative rotation between the rim-forming chamber and the container during the forming of a rolled rim in the container.

5 Claims, 9 Drawing Sheets

METHOD FOR FORMING A ROLLED RIM IN A FABRICATED THERMOPLASTIC CONTAINER

BACKGROUND OF THE INVENTION

1. Field of the Invention

This invention relates to a method and apparatus for forming a rolled rim at the mouth of a cup or container which has a body that is fabricated from a sheet of a thermoplastic material.

2. Description of the Prior Art

U.S. Pat. No. 3,854,583 (Amberg et al.) discloses a container that includes a body which is fabricated from a sheet of an expanded thermoplastic material and which is provided with a rolled rim or bead at the mouth of such container. Such rolled rim or bead helps to stiffen the container at the mouth thereof, it provides a smooth edge for drinking a beverage from the container, and it provides a protrusion from the sidewall of the container that is useful in securing a cap or closure to the container. Containers of the type illustrated in the aforesaid U.S. Pat. No. 3,854,583 have been extensively utilized as cups for single service quantities of a beverage, for example, coffee, and, when so utilized, the bodies of such containers have typically been manufactured in a nestable or frustoconical configuration from rectangular blanks of a heat-shrinkable thermoplastic material by a process which includes the shrinking of a cylindrical sleeve formed from such blank against the outer surface of a frustoconical forming mandrel. Typically, such cups have been produced by apparatus similar to that disclosed in U.S. Pat. No. 4,053,346 (Amberg et al.), and may also be produced by apparatus similar to that disclosed in U.S. Pat. No. 4,072,549 (Amberg et al.).

In the manufacture of cups of the type described in the aforesaid U.S. Pat. No. 3,854,583, either by apparatus of the type-described in the aforesaid U.S. Pat. No. 4,053,346 or by the apparatus of the type described in the aforesaid U.S. Pat. No. 4,072,549, heretofore it has been necessary to effect rotation of the cup relative to the rim-forming tooling of the apparatus during the rolling of the rim in the body of the cup to obtain a properly formed and rolled rim. As is clear from each of the aforesaid U.S. Pat. Nos. 4,053,346 and 4,072,549, it is necessary to provide rather complex apparatus to effect such relative rotation between each of the cups and the rim-forming tooling that is used to roll rims in such cups, and the complexity of such apparatus adds to the initial expense in manufacturing such apparatus and to subsequent expenses related to its maintenance and operation.

SUMMARY OF THE INVENTION

In accordance with the present invention there is provided a method and apparatus for forming a rolled rim or bead at the mouth of a container that is formed by fabrication from a sheet of a thermoplastic material, which method and apparatus avoids the need for having relative rotation between the container and apparatus. The method employs, and the apparatus incorporates, a mandrel for receiving the container to be rimmed, and this mandrel incorporates tooling at its base to form a first part of a substantially closed annular chamber for forming the rolled rim in the container. A second part of the substantially closed annular chamber is formed by an annular member which is reciprocable between a first position in which it is adjacent to the tooling at the base of the mandrel to form the substantially closed annular chamber between the first part and an annular surface portion of such reciprocable annular member, and a second position which is away from the tooling at the base of the mandrel to permit the rimmed container to be removed from the mandrel. The method also avoids the need to transfer an unrimmed cup from the mandrel on which it is formed to a rimmer assembly and the apparatus therefor.

Accordingly, it is an object of the present invention to provide an improved method and apparatus for forming a rolled rim in a container that is fabricated from a sheet of a thermoplastic material. It is a further object of the present invention to provide a method and apparatus for forming a rolled rim in a container that is fabricated from a sheet of thermoplastic material without effecting relative rotation between such container and rim-forming tooling that is incorporated in such apparatus and employed in such method. For a further understanding of the present invention and the objects thereof, attention is directed to the drawing and the following brief description thereof, to the detailed description of the preferred embodiment and to the appended claims.

DETAILED DESCRIPTION OF THE PREFERRED EMBODIMENT

Figure 8:
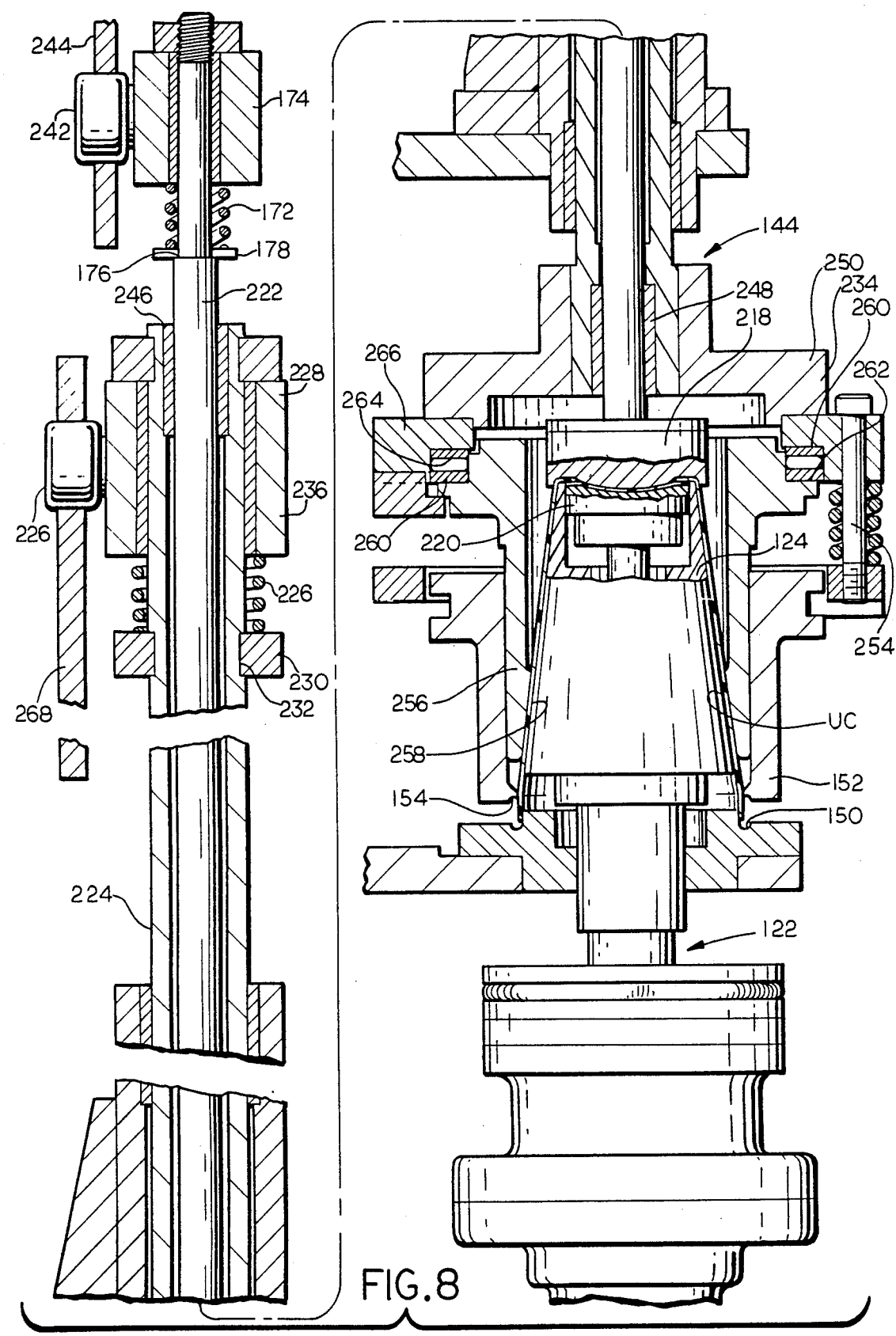
FIG. 8 is a fragmentary view at an enlarged scale and partly in vertical cross-section of the upper portion of the apparatus illustrated in FIG. 4.
Figure 9:
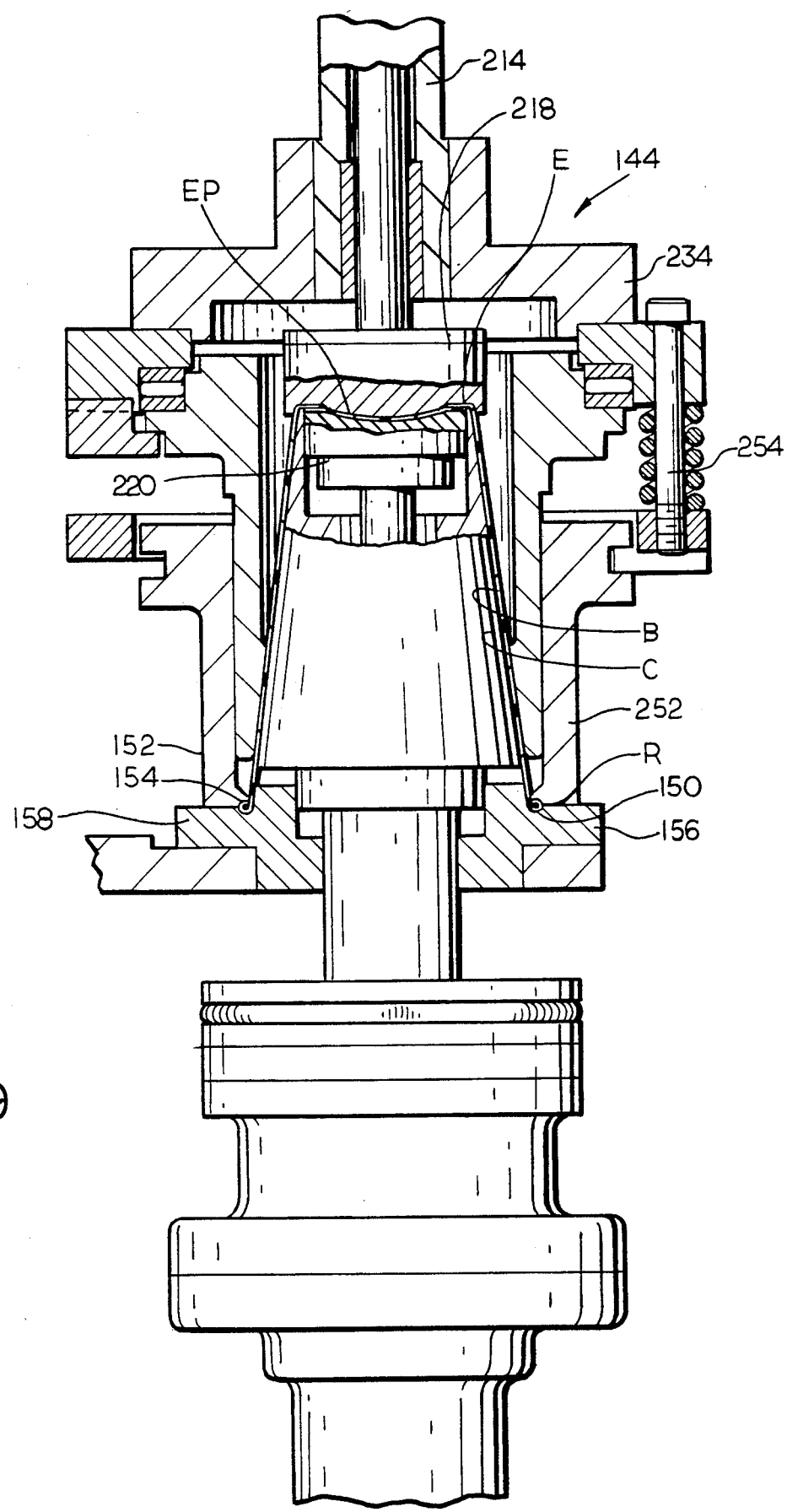
FIG. 9 is a fragmentary view at an enlarged scale and partly in vertical cross-section of the apparatus illustrated in FIG. 8 at a still later state of the operation of such apparatus.

As is shown in the drawing figures, the rim forming tooling of the apparatus of the present invention is utilized to form a rolled rim R, FIG. 9, preferably a tightly rolled rim, at the open mouth of a container C, FIG. 9, by rolling the marginal portion of an unrimmed container UC, FIG. 8. The container C, which is shown as being manufactured in an inverted position in relation to its normal use position, may be considered to be circular in cross-section and is shown as having a nestable or generally frustoconical configuration. The rolled rim R of the container C is located at the open, larger end thereof, and the container C also has a smaller end E, FIG. 9, which is closed, as is described in the aforesaid U.S. Pat. No. 3,854,583, so that the container C, when in an upright position, can hold a liquid, for example, hot coffee. Of course, it is contemplated that cylindrical or other non-nestable containers can be provided with a rolled rim at an open end thereof similar to the rolled rim R of the container C. In any case, the container C, or at least a body portion B thereof, FIG. 9, is preferably fabricated from a rectangular blank of a suitable heat-shrinkable thermoplastic material in accordance with the teachings of the aforesaid U.S. Pat. No. 3,854,583, and apparatus generally similar to that disclosed in the aforesaid U.S. Pat. No. 4,053,346 or generally similar to that disclosed in the aforesaid U.S. Pat. No. 4,072,549, appropriately modified to incorporate the rim forming tooling of this invention, may be employed in the manufacture of such containers. Alternatively, the apparatus according to the following description may be employed to manufacture such container C.

In the manufacture of containers for the serving of single service quantities of a beverage, viz., 6–20 oz. containers, by any of the types of apparatus referred to above, each container, typically, is fabricated from a blank of a rigid, oriented, expanded polymeric material, for example, expanded general purpose or medium impact polystyrene, with an initial thickness of approximately 18–25 mils (0.018–0.025 inch) and with a density of approximately 10–12 PCF (pounds per cubic foot). Of course, the use of other types of rigid thermoplastic materials is contemplated, but expanded polystyrene, alone or in combination with other materials, for example, with thin surface layers of polyethylene for lustre, is preferred for reasons of economy, rigidity, and insulating characteristics.

Figure 1:
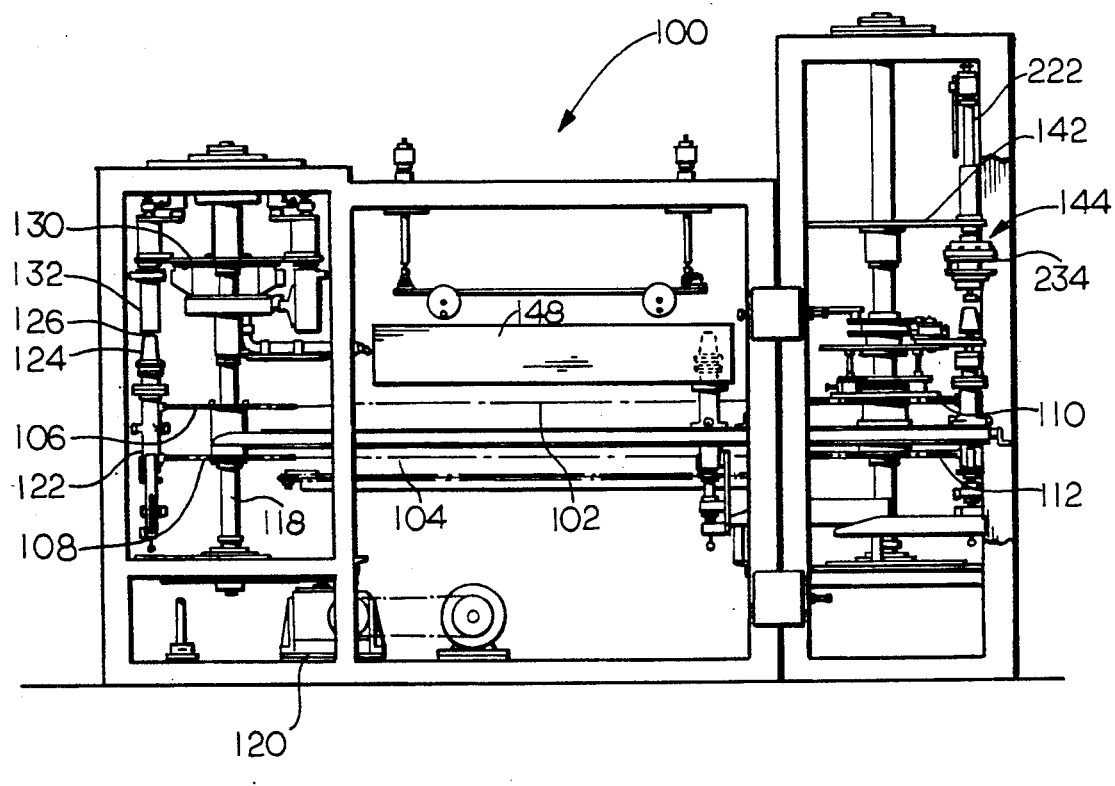
FIG. 1 is an elevational view of a cup making machine which incorporates rim-forming tooling according to a preferred embodiment of the present invention, a portion of the structure of such machine being omitted for the sake of clarity.
Figure 2:
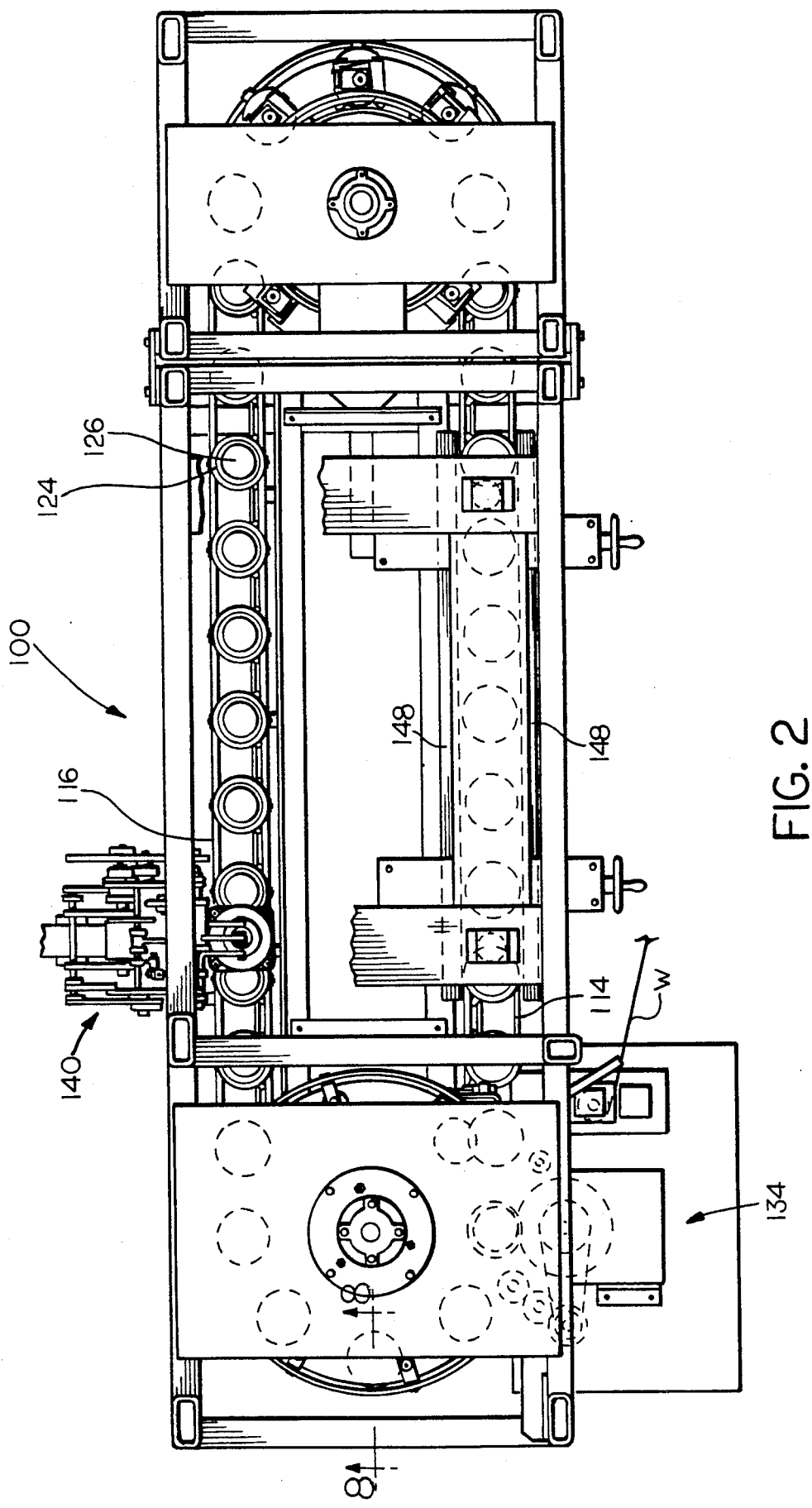
FIG. 2 is a plan view, at an enlarged scale, of the machine of FIG. 1, with some of the structure that was omitted from FIG. 1.
Figure 3:
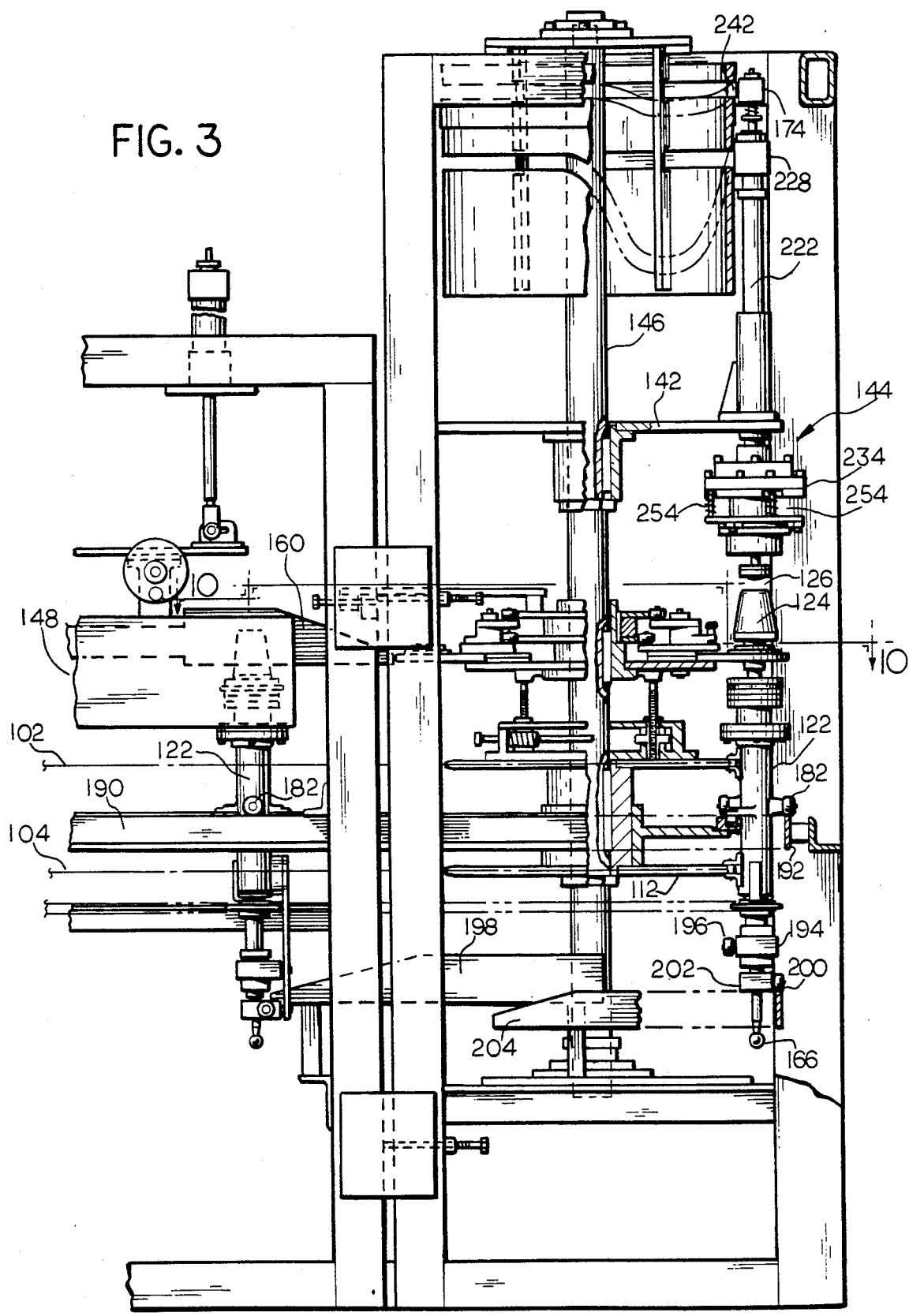
FIG. 3 is a fragmentary elevational view, at an enlarged scale and partly in cross-section, of the machine of FIGS. and 2 at the hand hand of the machine as it is illustrated in FIGS. 1 and 2.
Figure 4:
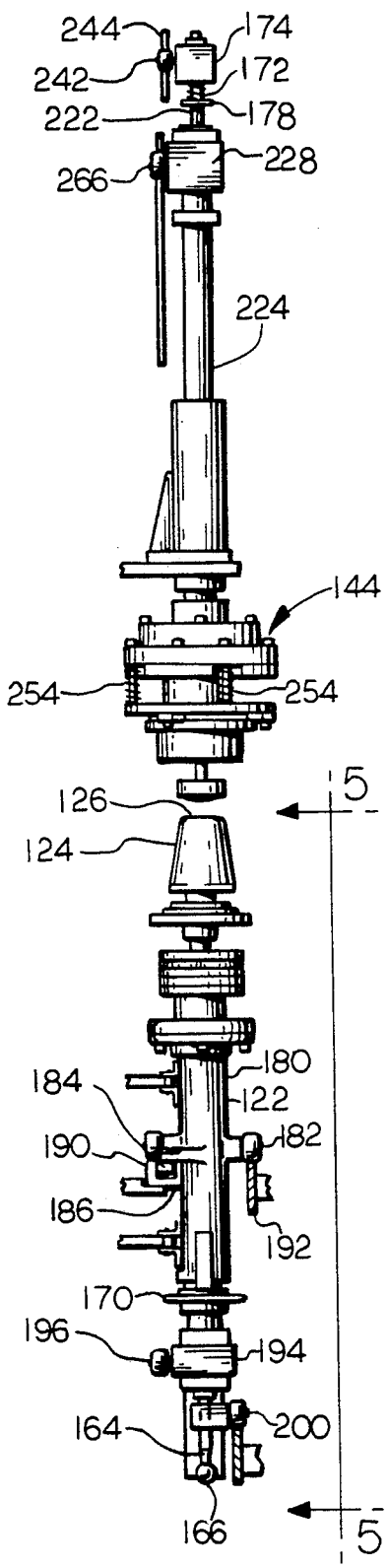
FIG. 4 is an elevational view, partly in cross-section and partly schematic, of the rim-forming tooling of the apparatus of FIGS. 1–3 in an early state of the operation of such tooling.

A cup making machine 100 according to FIGS. 1–3 comprises vertically spaced and horizontally extending carriage chains 102 and 104 which are trained around coaxial winder turret carriage sprockets 106 and 108, respectively, at the left hand end of the machine 100 and around coaxial rimmer turret carriage sprockets 110 and 112, respectively, at the right hand end of the machine, for travel in an endless pattern having spaced apart straight lineal portions 114 and 116. The sprockets 106 and 108 are secured to a vertical winder turret shaft 118 which is rotatably driven about its central axis by a conventional motor operated drive unit 120 so that the carriage chains 102 and 104 travel in unison through the machine. The cup making machine 100 also comprises a series of horizontally spaced apart and vertically extending shrink mandrel carriage units 122 each of which is secured both to the carriage chain 102 and the carriage chain 104 for travel therewith. Each shrink mandrel carriage 122 has, at its upper end, a frustoconically shaped shrink mandrel portion 124, each shrink mandrel portion 124 having its smaller end 126 at the top thereof.

The winder turret shaft 118 also carries a winder turret 130 at its upper end for synchronized rotation of the turret 130 with the sprockets 106 and 108. The winder turret 130 is provided with a multiplicity of cylindrical sleeve forming mandrels 132 which are evenly spaced from the central axis of the turret 130 and equidistantly around the periphery thereof. The sleeve forming mandrels 132 extend downwardly from the turret 130, and each mandrel 132 is positioned to travel in axial alignment with a shrink mandrel carriage unit 122 for a semi-circular portion of each rotation of the winder turret 130.

Figure 7:
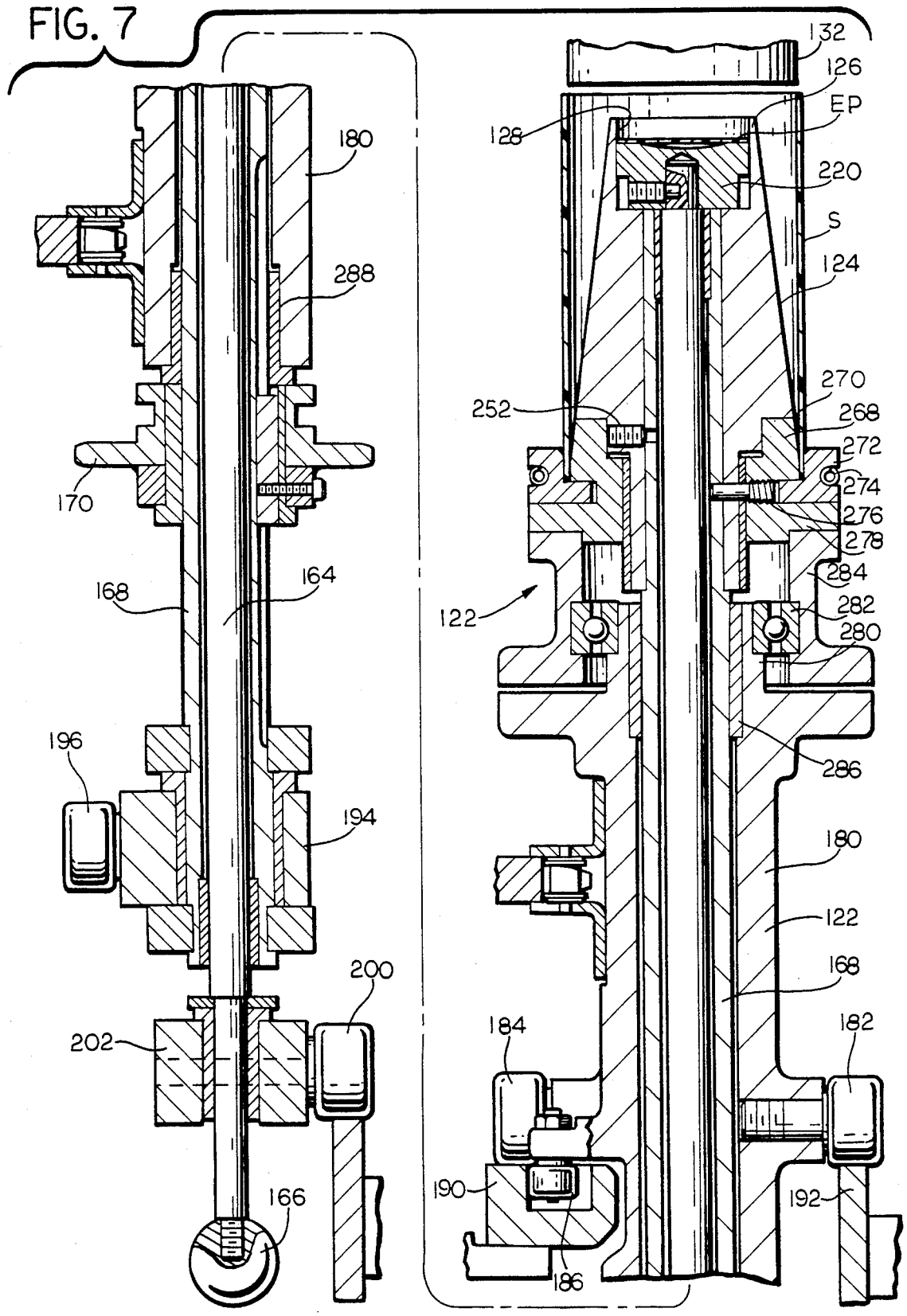
FIG. 7 is a broken fragmentary view at an enlarged scale and partly in vertical cross-section of a portion of the apparatus illustrated in FIGS. 4 through 6.

Cylindrical sleeves S are formed in succession on the sleeve forming mandrels 132 from rectangular blanks which are successively severed from a web W, FIG. 2, of indefinite length of a suitable heat-shrinkable material at a sleeve winding station, which is illustrated generally by reference numeral 134, the details of which are not a feature of the present invention. Each sleeve S is formed on the sleeve forming mandrel 132 which is positioned approximately at the 6 o'clock position of the winder turret 130, as is illustrated in FIG. 2 where the turret 130 is rotating in a counterclockwise direction, and each sleeve S is then transferred from the sleeve forming mandrel 132 on which it is formed to the shrink mandrel portion 124 of the mandrel carriage unit 122 which is aligned with such sleeve forming mandrel 132 when such sleeve forming mandrel 132 has advance to approximately the 9 o'clock position of the turret 130, as it is illustrated in FIG. 2, by a mechanism which is not a part of the present invention. The relationship between a sleeve forming mandrel 132 and a mandrel carriage unit 122 immediately after the transfer of a sleeve S from the former to the latter is illustrated in FIG. 7. The mandrel carriage units 122 with cylindrical sleeves S on the mandrel portions 124 thereof are thereupon advanced successively through a heating section 148 of the cup making machine. The heating section 148, preferably, is in the form of elongate electric infrared radiant heaters above and on opposite sides of the mandrel carriage units 122 as they advance from the left hand end of the cup machine 100 to the right hand end thereof, and because of the heat shrinkability of the material of the sleeves S, the heating section 148 gradually causes the cylindrical sleeves S on the shrink mandrel portions 124 of the mandrel carriage units 122 to shrink into tight engaging relationship therewith, forming the bodies of unrimmed containers such as the body of the unrimmed container UC illustrated in FIG. 8. Further, each mandrel carriage unit 122 is rotated about its own axis by means which do not constitute a part of the present invention as it passes through the heating section 148 to provide for uniform shrinkage of the sleeves S on the mandrel portions 124.

Each unrimmed container UC is provided with an end piece EP in juxtaposition therewith by an end piece punch station, indicated generally at 140, which punches circular pieces from a web of a suitable material, for example, material of the same type used in the fabrication of the cylindrical sleeves S, and which successively deposits end pieces EP in horizontally extending recesses of the mandrel carriage units 122, specifically in a horizontally extending recess 128 (FIG. 7) at the smaller end 126 of the shrink mandrel portion 124 of each mandrel carriage unit 122, as the mandrel carriage units 122 are moving along the lineal portion 116 of their travel through the cup machine 100. The unrimmed containers UC and the end pieces EP are joined together and the body of the unrimmed containers are rimmed at the right hand end of the cup machine 100 by apparatus including a rimmer turret 142 and a plurality of rimmer assemblies, indicated generally at 144 in FIGS. 1, 3, 4, 8, and 9, which are evenly spaced from the central axis of the turret 142 and equidistantly around the periphery thereof. The rimmer turret 142 is secured to the upper end of a generally vertically extending shaft 146, which also carries the sprockets 110 and 112, and each of the rimmer assemblies 144 is positioned in axial alignment with a shrink mandrel carriage unit 122 for a semi-circular portion of each rotation of the rimmer turret 142.

Figure 10:
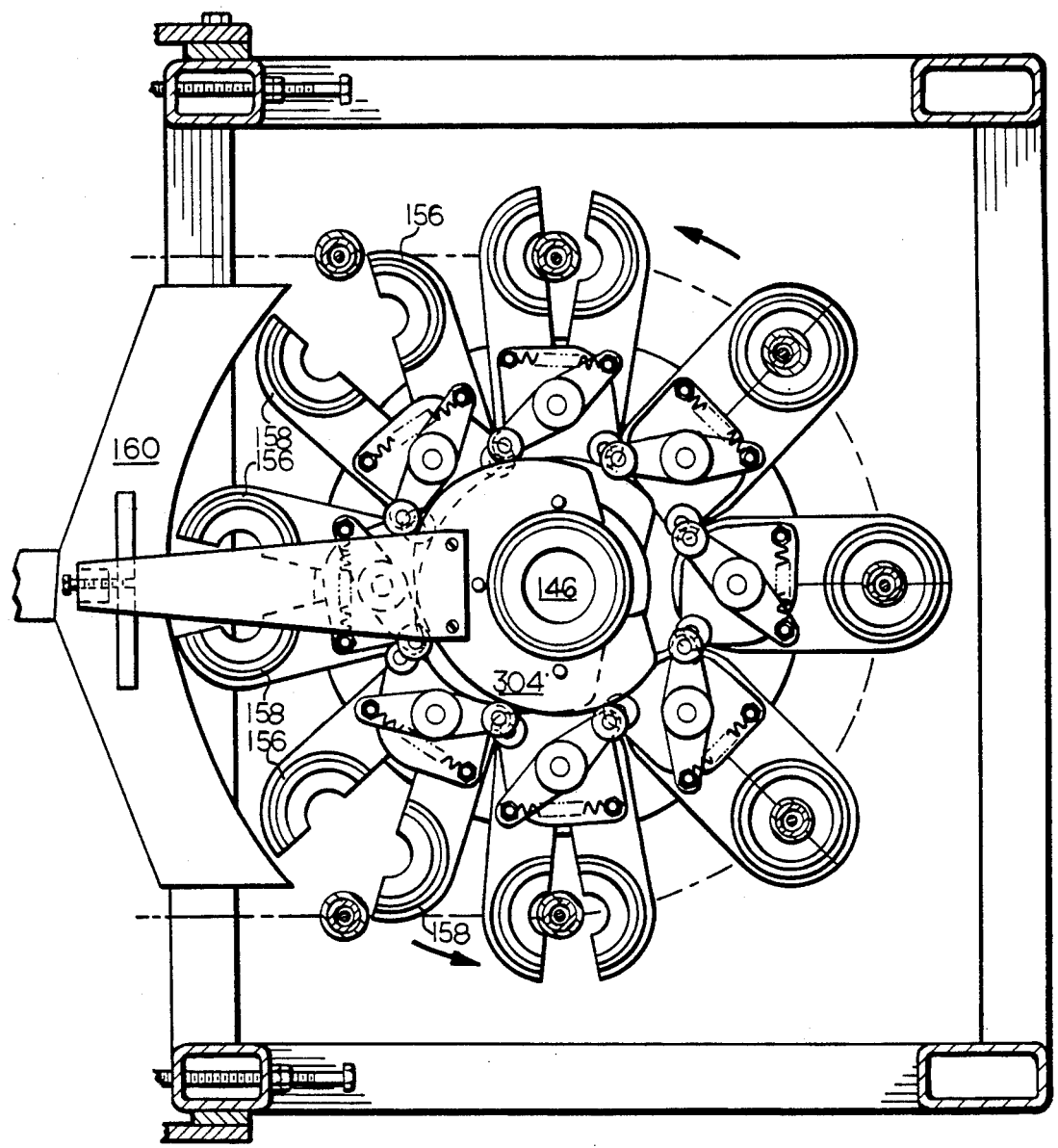
FIG. 10 is a fragmentary sectional view taken on line 10—10 of FIG. 3.
Figure 11:
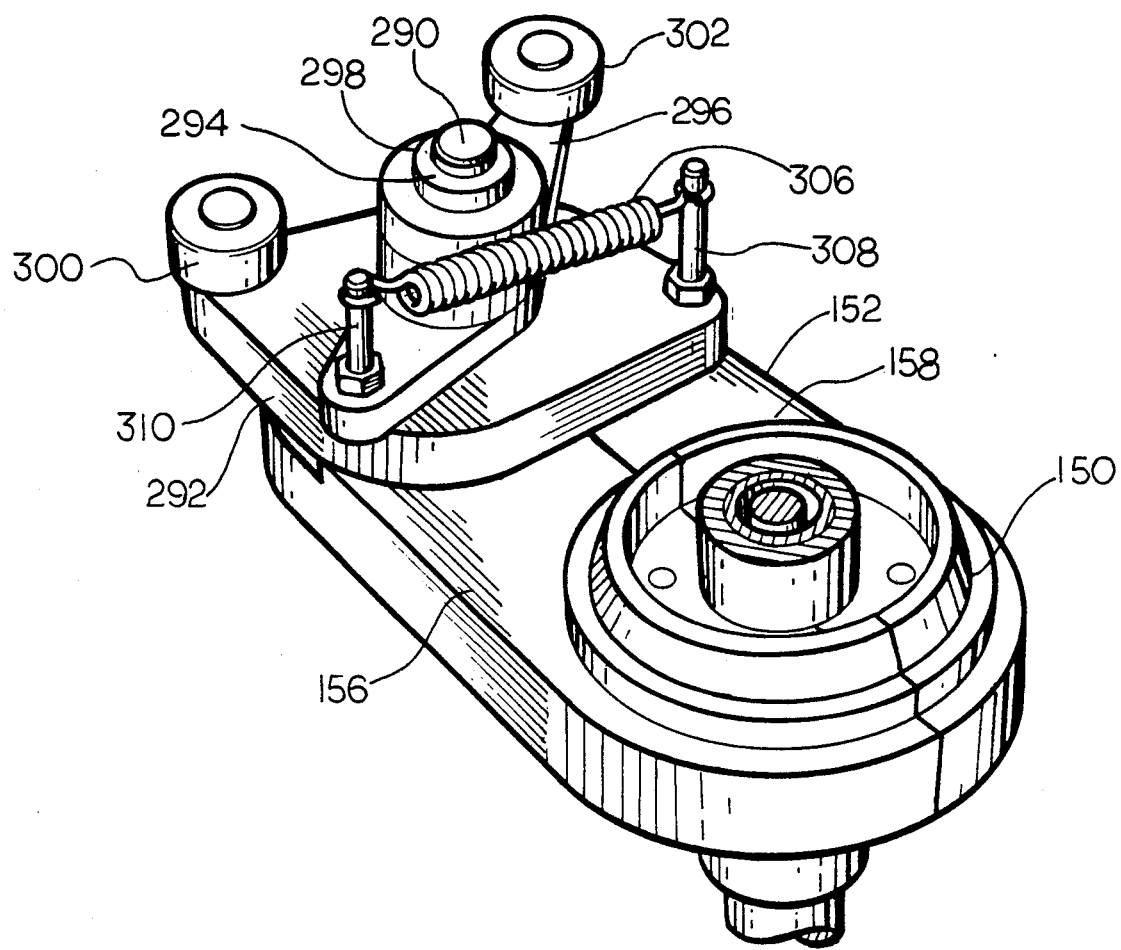
FIG. 11 is a perspective view illustrating a portion of the apparatus of the present invention.

Each mandrel carriage unit 122 is provided with a first rim-forming surface 150, FIGS. 8 and 9, immediately below the mandrel portion 124. As is shown in FIGS. 10 and 11, the rim forming surface 150 is formed in split members 156 and 158 which rotate with the shaft 146 and which are repeatedly brought together and then separated as will be hereinafter described more fully. The first rim-forming surface 150 receives the marginal portion of the unrimmed container UC when the unrimmed container UC is depressed by the action of a rimmer assembly 144, as it moves from its FIG. 8 position to its FIG. 9 position, by means which will be hereinafter described more fully, and the rim-forming surface 150 assists in the outward flaring and reversing of such marginal portion that is a part of the process of rolling the rimmed rim R therein. The rimmer assembly 144 also includes an annular member 152, FIGS. 8 and 9, which is reciprocable coaxially of the aligned vertical central axes of the rimmer assembly 144 and the shrink mandrel portion 124 of the mandrel carriage unit 122, the reciprocation of the annular member 152 being effected in a manner which will be hereinafter described more fully. The annular member 152 is provided with a second rim-forming surface 154 and is reciprocable between a rimming position, as shown in FIG. 9, in which the second rim-forming surface 154 of the annular member 152 and the first rim-forming surface 150 of the mandrel carriage unit 122 cooperate with one another to form a substantially closed, generally toroidal rimming chamber, and a retracted position, as shown in FIG. 8, to permit the container C to be removed from the cup making machine, such removal being accomplished along the lineal portion 116, in advance of the bottom punch station 140, for example, by a conventional vacuum take-off device, not shown.

For proper rimming of the unrimmed container UC without providing for relative rotation between the unrimmed container UC and the rimming chamber that is defined by the rim-forming surface 150 and the rim-forming surface 154, it is necessary to heat the marginal portion of the unrimmed container UC at the open mouth thereof while the rolled rim R is being formed therein. For example, in the case of an unrimmed container UC which is fabricated from a sheet of expanded, general purpose or medium-impact polystyrene, it is desirable that the temperature of the marginal portion of the unrimmed container UC near the open mouth thereof be approximately 190–230 degrees F. during the formation of a rolled rim R therein. This heating is accomplished in the preferred embodiment of the present invention by an arcuate warm air distributor 160, FIGS. 3 and 10, which distributes warm air from a conventional air heater-blower, not shown, against each set of first and second split members 156 and 158 as they rotate with the rimmer turret shaft 146 from approximately the 11:30 o'clock position shown in FIG. 10 to approximately the 7:30 o'clock position. Thus, the heat which is stored in each of the split members 156 and 158 of each set of split members during each rotation of the shaft 146 is transferred to the marginal portion of the unrimmed container UC during the forming of the rim R therein by the rim-forming surface 150 that is made up by such set of split members 156 and 158.

Each mandrel carriage unit 122 is provided with a central rod 164 which is vertically reciprocable and which is provided with a cam engaging ball member 166, FIG. 7, at its bottom to cause the central rod 164 to rise when the ball member 166 engages a cam, not shown, at the conclusion of the rimming of a container C to assist in the ejection of the container C from the mandrel carriage unit 122, as will be hereinafter described more fully. The weight of each mandrel carriage unit 122 plus the weight of ball member 166 and the rod 164 will result in a gravity return of the unit which includes such members after the ball member 166 moves out of contact with the cam. The central rod 164 reciprocates within a tube 168 which is both reciprocable and rotatable and which carries the shrink mandrel portion 124 of the mandrel carriage unit 122. The tube 168 has a sprocket 170 non-rotatably and reciprocably affixed thereto, and the sprocket 170 engages a fixed chain, not shown, to impart rotation to the tube 168 and the mandrel portion 124 as the mandrel carriage unit 122 is cycled through the cup-making machine 100, especially in the heating station 148 for uniform heating of each sleeve S during the shrinkage thereof.

Figure 5:
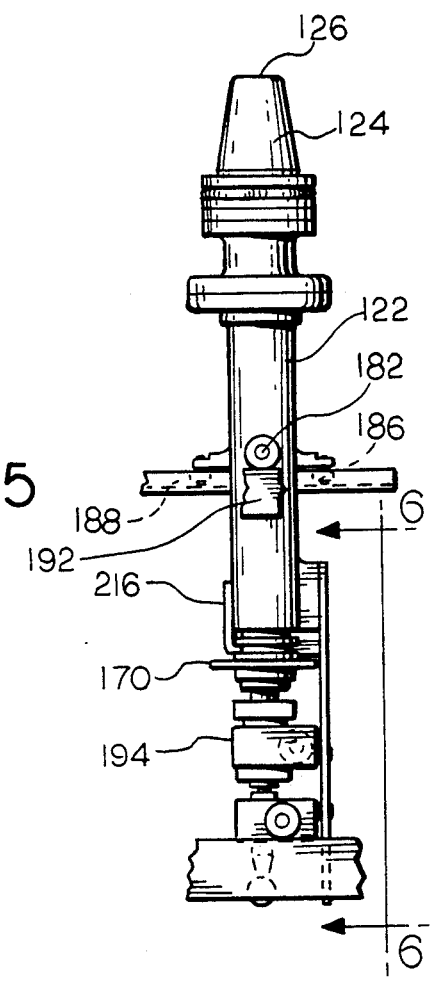
FIG. 5 is a fragmentary view at an enlarged scale of a portion of the apparatus illustrated in FIG. 4 taken on line 5—5 of FIG. 4.

The tube 168, in turn, is surrounded by a non-rotatable annular housing member 180 which carries opposed guide wheels 182 and 184 which are rotatable about horizontal axes and front and rear guide wheels 186 and 188 which are rotatable about vertical axes. The guide wheels 182 and 184 and the guide wheels 186 and 188 are positioned near the upper end of each mandrel carriage unit 122, and one of the guide wheels 182 and 184, shown as the guide wheel 184, engages the top of an upwardly facing U-shaped guide track 190 which extends around the machine 100 while both of the guide wheels 186 and 188 engage the inside of one of the legs of the guide track 190 to guide the movement of each such mandrel carriage unit 122 as it moves in its cycle around the machine 100. The other of the guide wheels 182 and 184, shown as the guide wheel 182, engages a cam surface 192 to control the horizontal elevation of each mandrel carriage unit 122. The annular housing member 180 is provided with sprocket support members 214 and 216 (FIG. 5) which are attached to an alignment plate 212 (FIG. 6) and which supports the sprocket 170 at a fixed elevation with respect to the annular housing member, notwithstanding the reciprocation of the central rod 164 to which the sprocket is non-rotatably attached.

Figure 6:
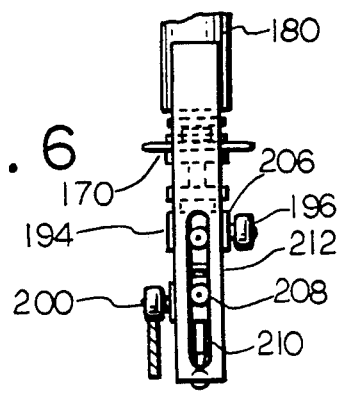
FIG. 6 is a fragmentary view at an enlarged scale of a portion of the apparatus illustrated in FIGS. 4 and 5 taken on line 6—6 of FIG. 5.

The reciprocation of the sleeve 168 is actuated by a cam follower 196 which is attached to a sleeve 194 which, in turn, is affixed to the sleeve 168. The cam follower 196 engages a cam surface 198, FIG. 3, to cause the sleeve 168 and the mandrel portion 124 of the mandrel carriage unit 122 to move toward the associated rimmer assembly 144 as the mandrel carriage unit 122 begins its semi-circular arcuate travel around the sprockets 110 and 112 to bring the shrink mandrel portion 124 into the position relative to the rimmer assembly 144 which is illustrated in FIG. 8. Further, the reciprocation of the central rod 164 relative to the sleeve 168 is actuated by a cam follower 200 which is attached to a sleeve 202 which, in turn, is affixed to the central rod 164 to cause the central rod 164 to rise from its FIG. 7 position, where its upper extremity is part of the horizontally extending recess 128 to receive the end piece EP, to its FIG. 8 position where it presents the end piece EP and the then inturned marginal end portion of the unrimmed container UC for engagement by the adjacent rimmer assembly 144 for the sealing of the marginal end portion of the unrimmed container UC and the portion of the end piece EP which it overlies to one another. The movement of the cam follower 200 and the sleeve 168 is actuated by a cam surface 204, FIG. 3, which engages the cam follower 200 after the cam follower 196 has engaged the cam surface 198. As is shown in FIG. 6, the vertical orientation of the lower end of the mandrel carriage unit 122 during the vertical motion of the sleeve 168 and the central rod 164 is stabilized by an upper guide wheel 206 and a lower guide wheel 208 which ride in a vertical slot 210 in the alignment plate 212 which is attached to the housing member 180 and which extends downwardly therefrom.

As is shown in FIG. 9, each rimmer assembly 144 has an end pressing member 218 which engages the end E of an unrimmed container UC during the forming of a rim R therein to simultaneously join an outer peripheral portion of end piece EP to an overlapping, inturned marginal portion of the unrimmed container UC. In that regard, each mandrel carriage unit 122 has a back-up member 220 at the top of the central rod 164 which is reciprocable therewith and which supports the underside of the end piece EP during the end pressing operation. Preferably, the joining of the end piece EP to the inturned marginal portion of the unrimmed container UC, in the case of a container C whose end piece EP and body B are formed from compatible thermoplastic materials, is performed by heat sealing, to avoid the need for a separate adhesive, and this may be accomplished by the apparatus of the present invention since the warm air distribution 160 will impart sufficient heat to the end pressing member 218 and the back-up member 220, which are metallic and which have sufficient mass to retain substantial thermal energy, to accomplish a heat sealing operation without the need for supplemental heating of such members. As is clear from FIG. 9, both the end pressing member 218 and the back-up member 220 are contoured to provide a slight inward dishing of the central portion of the end piece EP so that the completed container C will be supported with more stability in its upright orientation. Further, since the back-up member 220 is supported on the central rod 164 which is reciprocable, it may be maintained at an elevation which is lower than its FIG. 9, end pressing position, FIG. 7, as it passes through the heating section 148 to shield the end piece EP from overheating in the heating section 148.

The end pressing member 218 is mounted at the lower end of a vertically extending elongate central rod 222 which is reciprocable against the downwardly directed action of a spring 172 that is trapped between a fixed member 174 and a collar 178 which bears against an upwardly facing shoulder 176 of the rod 222. The central rod 222 is reciprocable within a sleeve 224 which is reciprocable against the downwardly directed action of a spring 226, and the spring 226 is trapped between an annular member 228 and a collar 230 which is secured in an outwardly facing annular recess 232 in the annular member 228. The sleeve 224 is also rotatable with respect to the central rod 222 and upper and lower bushings 246 and 248, respectively, are provided between the sleeve 224 and the central rod 222 to facilitate such rotation. Further, the sleeve 224 is rotatable with respect to the annular member 228 and a bushing 236 is provided between the annular member 228 and the sleeve 224 to facilitate such rotation. The annular member 228 and the bushing 236 are axially fixed with respect to the sleeve 224 by a collar 238 which is secured in an outwardly facing annular recess 240 in the sleeve 224 and by the upwardly directed force which is imposed against its underside by the spring 226. Downward movement of the central rod 222 at an appropriate point in the travel of the rimmer assembly 144 of which it a part, to move the end pressing member 218 into its FIGS. 8 and 9 pressing position, is imparted by a cam roller 242 which is attached to the fixed member 174 for rotation about a horizontal axis and which engages a fixed cam surface 244. The cam surface 244 is positioned to engage the cam roller 242 approximately at the 7 o'clock position in FIG. 10 and terminates to release the central rod 222 and the end pressing member 218 to return to the FIG. 4, disengaged, positions thereof approximately at the 11 o'clock position in FIG. 10.

The sleeve 224 of each rimmer assembly 144 carries an annular assembly 234 which includes an upper outer annular member 250 that is secured to the outside of the sleeve 224, the annular member 152 which is resiliently attached to the lower end of the upper outer annular member 250 by means of a plurality of circumferentially spaced-apart bolt and spring assemblies 254, shown as three of such bolt and spring assemblies, the rim forming surface 150 constituting a surface of the annular member 152, and an upper annular member 256 which has an inner frustoconically shaped surface 258 that engages the outside surface of an unrimmed container UC on a shrink mandrel portion 124 of a shrink carriage unit 122 as the rimming process is about to begin, FIG. 8. Thrust bearings 260 are positioned between an annular surface 262 of the annular member 152 and an annular surface of a collar portion 266 of the upper outer annular member 250 to provide for relative rotation between the upper outer annular member 250 and the lower annular member, on the one hand, and the upper inner annular member 256, on the other hand. This will permit the upper inner annular member 256 to rotate with the shrink mandrel portion 124 of the shrink carriage unit, which is affixed to the tube 168 of the shrink carriage unit by a screw 252, FIG. 8, as the tube 168 is rotated, as heretofore explained. Downward movement of the sleeve 224 and the annular assembly 234 which is carried thereby at an appropriate point in the travel of the rimmer assembly 144 of which it is a part, to move the surface 258 of the upper inner annular member 256 into engagement with the outer surface of an unrimmed container UC and then to move the rim forming surface 150 of the lower annular member into its FIG. 9, rim forming, position with respect to the split member 156, is imparted by a cam roller 266 which is attached to the annular member 228 for rotation about a horizontal axis and which engages a cam surface 268. The cam surface 268 is positioned to engage the cam roller 266 approximately at the 7 o'clock position in FIG. 10 and terminates to release the sleeve 224 and the annular assembly 234 to return to the FIG. 4, disengaged, positions thereof approximately at the 12 o'clock position in FIG. 10. As is apparent from FIG. 8, during the downward stroke of the sleeve 224, the inside surface 258 of the upper inner annular member 256 will engage the unrimmed container UC before the rim forming surface 150 of the annular member moves into its FIG. 9, rim forming position. Further axial movement of the annular member 152 with respect to the upper inner annular member 256 is accomplished by the travel of the outer annular member 250 which is caused by the cam 268 and which compresses the spring 254 to complete the rimming process.

As is shown in FIG. 7, each mandrel carriage unit 122 also includes an annular lower shrink mandrel 268 whose outer surface 270 is aligned with the outer surface of the shrink mandrel portion 124 of the mandrel carriage unit to engage the inside of a lower marginal portion of a sleeve S and a segmented clamping member 272 which is constricted by a clamping spring 274 and which resiliently engages the outside of the lower marginal portion of the sleeve S to securely position the sleeve S with respect to the mandrel carriage unit at the time when the sleeve S is transferred to the mandrel carriage unit 122 from the sleeve forming mandrel 132 and through the travel of the mandrel carriage unit 122 through the heating section 148. The lower shrink mandrel 268 is attached to the tube 168 by a set screw 276 for rotation and reciprocation therewith, and the downward travel of the tube 168 to remove the lower shrink mandrel 268 and the segmented damping member 272 from engagement from such lower marginal portion, now the lower marginal portion of an unrimmed container UC, is timed to occur before the mandrel carriage unit 122 moves into alignment with a rimmer assembly 144. Rotation of the structure which includes the shrink mandrel 124, the lower shrink mandrel 268 and the segmented clamping member 272 with respect to the nonrotatable housing member 180 is permitted by attaching a flange 278 at the bottom of the lower shrink mandrel 272 to an annular collar 284 which surrounds a reduced diameter portion 280 of the housing member 180, and by positioning an annular bearing member 282 therebetween. Further, rotation of the tube 168 with respect to the housing member 180 is permitted by positioning upper and lower bushings 286 and 288, respectively, therebetween.

The sequential opening and closing of the first split member 156 and the second split member 158 of each annular member 152 with respect to one another, as heretofore described and as is illustrated in FIG. 11, is accomplished by pivoting the split members 156 and 158 for oscillation with respect to one another at a vertical axis 290, by attaching a first link 292 to an annular post 294 which extends upwardly from the first split member 156, by attaching a second link 296 to a rod 290 which extends upwardly from the second split member 158 through the annular post 294, by providing a first cam roller 300 attached to an interior portion of the first link 292, by attaching a second cam roller 302 to an interior portion of the second link 296, and providing a cam 304, FIG. 10, which is engaged by the cam rollers 300 and 302, as the annular member 152 rotates around the rimmer assembly shaft 146, as heretofore described. The first split member 156 and the second split member 158 are resiliently biased toward their closed positions by a double ended spring 306, one end of which is secured to a first pin 308 that extends upwardly from the first link 292 and the second end of which is secured to a screw pin 310 that extends upwardly from the second link 296.

Although the best mode contemplated by the inventors for carrying out the present invention as of the filing date thereof has been shown and described herein, it will be apparent to those skilled in the art that suitable modifications, variations and equivalents may be made departing from the scope of the invention, such scope being limited solely by the terms of the following claims:

What is claimed:

1. A method for forming a rolled rim at the mouth of a container having a closed end, the container further having a body which defines such mouth and which is formed from a thin, rollable thermoplastic material, said method comprising:

providing a first member having a first annular rim-forming surface;

positioning a container without a rolled rim at the mouth over the first member so that the mouth engages said first annular rim-forming surface;

providing a second member having a second annular rim-forming surface;

positioning said second member and said first member relative to one another such that said first annular rim-forming surface and said second annular rim-forming surface form a substantially closed rim-forming chamber while the mouth of the container is in engagement with said first annular rim-forming chamber to form a rolled rim at the mouth;

repositioning said second member and said first member relative to one another to move said first annular surface and said second annular surface away from one another and to thereby permit the withdrawal of a container with a rolled rim at the mouth from said first member; and withdrawing a container with a rolled rim from said first member;

wherein the portion of said container at the mouth thereof is at an elevated temperature during the forming of a rolled rim therein;

wherein there is no relative rotational movement between the container and said first member during the forming of the rolled rim at the mouth of the container;

wherein there is no relative rotational movement between the container and said second member during the forming of the rim at the mouth of the container; and wherein the body of the container is formed by fabrication from a sheet of an expanded material selected from the group consisting of general purpose polystyrene and medium impact polystyrene, and wherein the mouth of the container is heated to a temperature of approximate 190–230 degrees F. during the forming of the rolled rim at the mouth of the container.

2. A method according to claim 1 wherein the substantially closed rim-forming chamber has a configuration which is generally toroidal.

3. A method according to claim 1 wherein said first member has a portion which is generally frustoconically shaped and which is contained within said first annular rim-forming surface, said portion engaging said container in surface-to-surface contact.

4. A method according to claim 1 wherein said portion is heated by the transfer of heat from one of said first annular surface and said second annular surface during the forming of a rolled rim at the mouth of the container.

5. A method according to claim 1 wherein said portion is further heated by heat transfer of heat from the other of said first annular surface and said second annular surface during the forming of a rolled rim at the mouth of the container.

* * * * *